C. E. STELLER.
Plow Colter.
No. 87,220. Patented Feb. 23, 1869.
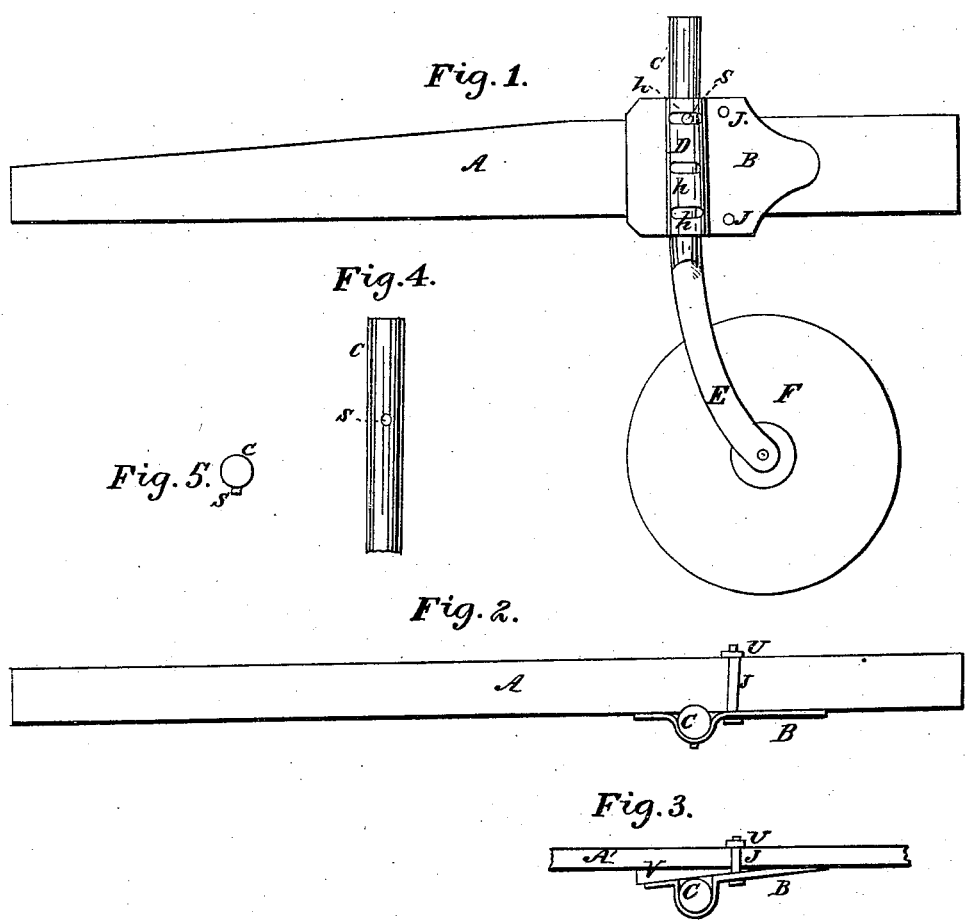

C. E. STELLER, OF CHICAGO, ILLINOIS.

Letters Patent No. 87,220, dated February 23, 1869; antedated February 11, 1869.

IMPROVEMENT IN REVOLVING COULTER.

The Schedule referred to in these Letters Patent and making part of the same.

*To all whom it may concern:*

Be it known that I, C. E. STELLER, of Chicago, in the county of Cook, in the State of Illinois, have invented a useful Improvement in Revolving Coulters; and I do hereby declare that the following is a full and exact description thereof, reference being had to the accompanying drawings, and to the letters of reference marked thereon, making a part of this specification, in which—

Figure 1 is an elevation of my invention.

Figure 2, a plan view of the same, attached to the wooden beam of a plow.

Figure 3, a plan view, attached to an iron beam.

Figure 4, a broken elevation of the shank of the coulter, detached from the socket in which it operates.

The nature of my invention consists in the use of a socket for supporting the shank of the revolving cutter, arranged with a series of horizontal slots, for adjusting the height of the cutter, in either of which a pin, attached to said shank, may be put, and have a reciprocating motion, and allow the coulter to swing to and from the landside, and thus travel easily, and follow the direction of the plow, to which it is attached, as when turning it around, and deviating from a direct line; and in a wedge, made to fit between the plow-beam and the socket, for throwing the shank outward to such a point as will adjust the coulter on a required line, the latter arrangement being especially necessary where the shank is to be attached to an iron beam.

In order to give a correct understanding of my invention, I have marked corresponding parts with similar letters, and will now give a detailed description.

A represents a wooden, and A', an iron beam, to which my device is attached.

D represents a cast-iron socket, which supports the shank C, of the coulter F, and has the slots $h\,h\,h$ made through it, in either of which a pin, S, attached to said shank, may be put, and thus regulate the depth which the coulter is to run in the ground, said slots $h$ permitting the pin to have a partial revolution in the socket, and thus allow the coulter F to follow any crooked course in which the plow may move.

The socket D has a flange, B, of such width as will permit the bolts J, which secure it to the beam, to pass through it, at the top and bottom of the latter, and through a clamp, U, at the opposite side of the beam, where they are fastened with nuts, in the usual manner.

V, fig. 3, represents a wedge, which is used to throw the socket D out from an iron beam, and thus place the coulter F in a suitable position for work, this wedge, however, only being necessary when a beam is so arranged as to bring the coulter inside of the landside of the plow, as is the case with many cross-beam plows now made.

I am not particular as to the construction of the socket, only so it is arranged with slots, or notches, for adjusting the height of the cutter, and permitting it to swing, as set forth.

Having thus described my device,

What I claim, and desire to secure by Letters Patent, is—

1. The socket D, arranged and constructed substantially as and for the purpose set forth.

2. The combination of socket D, shank C, and wedge V, arranged to operate the cutter F, substantially as described.

C. E. STELLER.

Witnesses:
G. L. CHAPIN,
A. HAYWARD.